United States Patent [19]
Takei

[11] Patent Number: 5,359,245
[45] Date of Patent: Oct. 25, 1994

[54] GUIDE UNIT AND A DIRECT DRIVE UNIT ON WHICH IT IS EQUIPPED

[75] Inventor: Seiji Takei, Kanagawa, Japan

[73] Assignee: Nippon Thompson Co., Ltd., Tokyo, Japan

[21] Appl. No.: 32,249

[22] Filed: Mar. 17, 1993

[30] Foreign Application Priority Data

Mar. 27, 1992 [JP] Japan .................................. 4-100331

[51] Int. Cl.⁵ ............................................ H02K 41/00
[52] U.S. Cl. ..................................... 310/12; 310/68 B
[58] Field of Search ................................. 310/12, 68 B

[56] References Cited
U.S. PATENT DOCUMENTS

4,954,859 9/1990 Kitazawa ........................ 354/173.11

Primary Examiner—Steven L. Stephan
Assistant Examiner—Judson H. Jones
Attorney, Agent, or Firm—Sughrue, Mion, Zinn, Macpeak & Seas

[57] ABSTRACT

The present invention relates to a compact guide unit and direct drive unit wherein, since plugs are arranged to cover the openings of insertion holes formed for insertion of fastening members in a track rail for one of either a detected element or detecting element that compose a position detection device for detecting the relative position of said track rail and a slider, the amount of space occupied by said position detection device can be made to be extremely small thereby allowing overall size of the unit to be reduced.

8 Claims, 8 Drawing Sheets

GUIDE UNIT AND A DIRECT DRIVE UNIT ON WHICH IT IS EQUIPPED

BACKGROUND OF THE INVENTION

1. Field of the Invention

The present invention relates to a guide unit performing guidance of relative motion that is used in mechanisms that perform relative motion in, for example, machine tools and industrial robots, and a direct drive unit to which a driving device in the form of a direct current linear motor is added to said guide unit.

2. Description of the Prior Art

Figure 1:
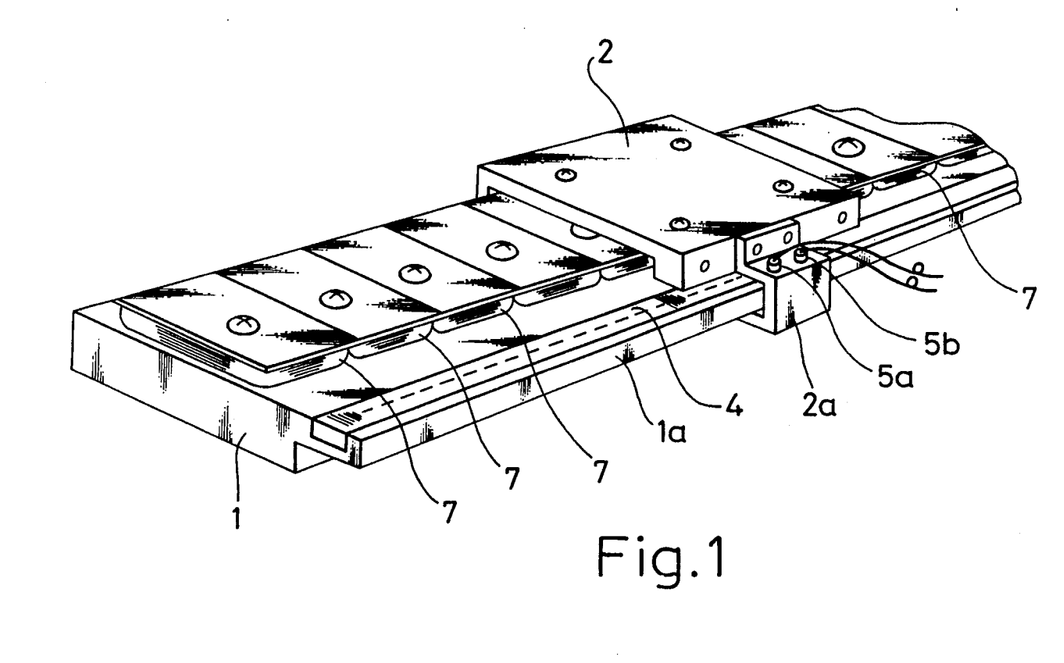
FIG. 1 is a perspective view of the essential components of an example of a direct drive unit of the prior art.

An example of this type of guide unit and direct drive unit of the prior art is indicated in FIG. 1.

As indicated in FIG. 1, said guide unit has long track rail 1 and slider 2 that moves along said track rail 1. More specifically, four rollers (not shown) are mounted on slider 2, and these rollers roll on a track formed along the lengthwise direction of track rail 1.

Protruding portion 1a is formed on one side of track rail 1. A detected element in the form of linear scale 4 is provided on said protruding portion 1a roughly over its entire length. In contrast, small bracket 2a is provided on the side of slider 2, and detecting elements in the form of light emitting element 5a and light receiving element 5b are mounted on said small bracket 2a. A position detection device for detecting the position of slider 2 with respect to track rail 1 is thus composed of linear scale 4, light emitting element 5a and light receiving element 5b.

On the other hand, the direct current linear motor that composes the above-mentioned guide unit along with a direct drive unit is composed as described below.

As indicated in the drawing, said linear motor is composed of a primary side, equipped with a plurality of armature coils 7 arranged side by side in the lengthwise direction of track rail 1 on said track rail 1, and a secondary side having a field magnet (not shown) attached to the bottom surface of slider 2. Furthermore, each armature coil 7 is respectively wrapped in the form of, for example, a rectangular loop. In addition, said field magnet contains a plurality of N and S magnetic poles alternately arranged along the direction in which slider 2 is to move, or in other words, along the lengthwise direction of track rail 1. Furthermore, slider 2 has high magnetic permeability, and acts as magnet yoke that composes the above-mentioned secondary side together with said field magnet.

In the direct drive unit having the constitution described above, thrust is generated in accordance with Fleming's left hand rule between the primary side and secondary side as a result of a prescribed electric current being supplied to armature coils 7. For example, if track rail 1 coupled to the primary side is taken to be the stationary side, slider 2, integrated into a single unit with the secondary side, moves as a result of this thrust. The position of slide 2 with respect to track rail 1 is then detected by the above-mentioned position detection device.

The examples of a guide unit and direct drive unit of the prior art described above have the shortcoming of each of the components that compose the position detection device for detecting the relative positions of track rail 1 and slider 2 occupying a relatively large amount of space, making this a problem to be solved in terms of achieving reduced size of the overall units.

SUMMARY OF THE INVENTION

In consideration of the above-mentioned shortcomings of the prior art, the object of the present invention is to provide a guide unit and direct drive unit that achieves reduced size.

The present invention pertains to a guide unit containing: a track rail wherein a track is formed in the lengthwise direction; a slider guided by the above-mentioned track; and, a position detection device for detecting the relative positions of the above-mentioned track rail and the above-mentioned slider; wherein, insertion holes for inserting fastening members for fixing said track rail onto a prescribed frame are arranged in a row in the above-mentioned lengthwise direction in the above-mentioned track rail, the above-mentioned position detection device is composed of a detected element and a detecting element, one of either the above-mentioned detected element or the above-mentioned detecting element is mounted on the above-mentioned slider, and the other is inserted into the above-mentioned insertion holes so as to cover the openings of said insertion holes.

In addition, the present invention also pertains to a direct drive unit containing: a track rail wherein a track is formed in the lengthwise direction; a slider guided by the above-mentioned track; a position detection device for detecting the relative positions of the above-mentioned track rail and the above-mentioned slider; and, a direct current linear motor that relatively drives the above-mentioned track rail and the above-mentioned slider; wherein, insertion holes for inserting fastening members for fixing said track rail onto a prescribed frame are arranged in a row in the above-mentioned lengthwise direction in the above-mentioned track rail, the above-mentioned position detection device is composed of a detected element and a detecting element, one of either the above-mentioned detected element or the above-mentioned detecting element is mounted on the above-mentioned slider, and the other is inserted into the above-mentioned insertion holes so as to cover the openings of said insertion holes.

In addition, in the direct drive unit as described above, the above-mentioned position detection device is composed of at least two or more electromagnetic conversion elements arranged so as to obtain waveforms having different phases, and comprises a latching device that latches the waveforms obtained from said electromagnetic conversion elements by converting said waveforms into digital data, and a control device that performs control by determining movement distance from this latched data and data previously stored in readable memory, adding this movement distance to distance stored in readable/writeable memory, writing this resulting distance into said memory and then performing arithmetic processing.

DESCRIPTION OF THE PREFERRED EMBODIMENTS

The following provides a description of a preferred embodiment of the guide unit and direct drive unit pertaining to the present invention with reference to the drawings. Furthermore, although the direct current linear motor equipped on this direct drive unit is of the movable magnet type, a direct current linear motor of the movable coil type can also be applied. In addition, said movable magnet type direct current linear motor is composed of a primary side and a secondary side. In the explanation of this embodiment, the primary side is taken to be the power supply side as well as the stationary side, while the secondary side is taken to be the movable side.

The following first provides an explanation of the constitution of the guide unit pertaining to the present invention.

Figure 2:
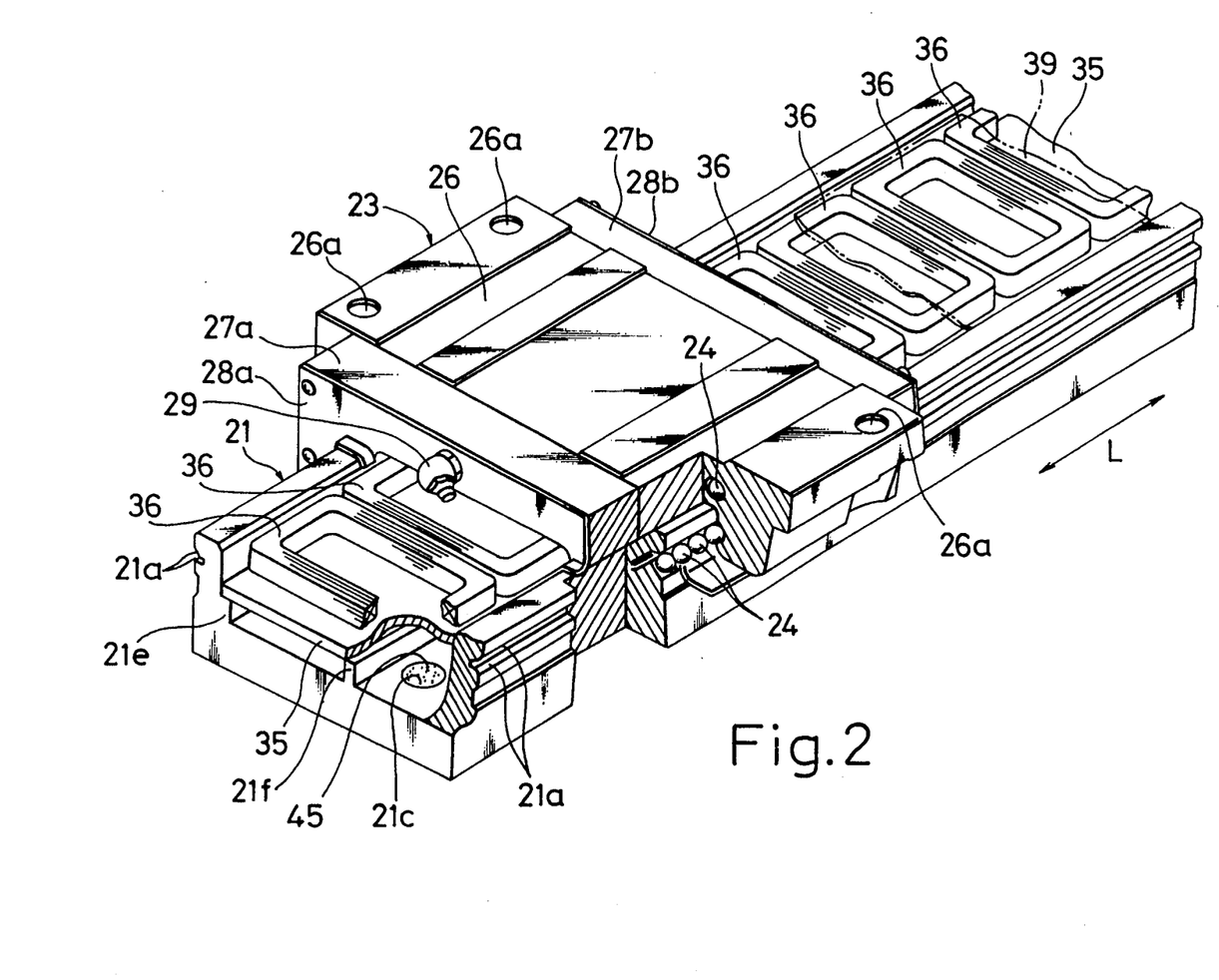
FIG. 2 is a perspective view, including a partial cross-section, of the essential components of the direct drive unit pertaining to the present invention.
Figure 3:
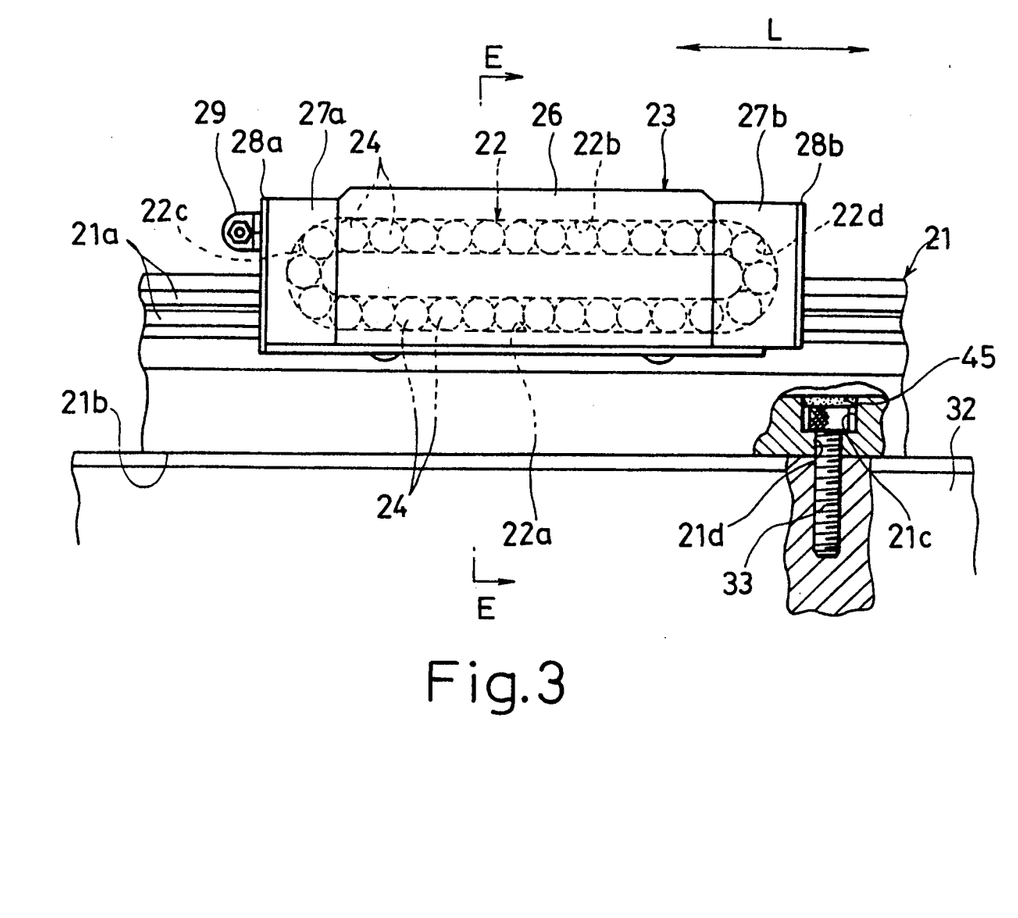
FIG. 3 is a side view, including a partial cross-section, indicating the direct drive unit indicated in FIG. 2 installed on the bed of a machine tool.
Figure 4:
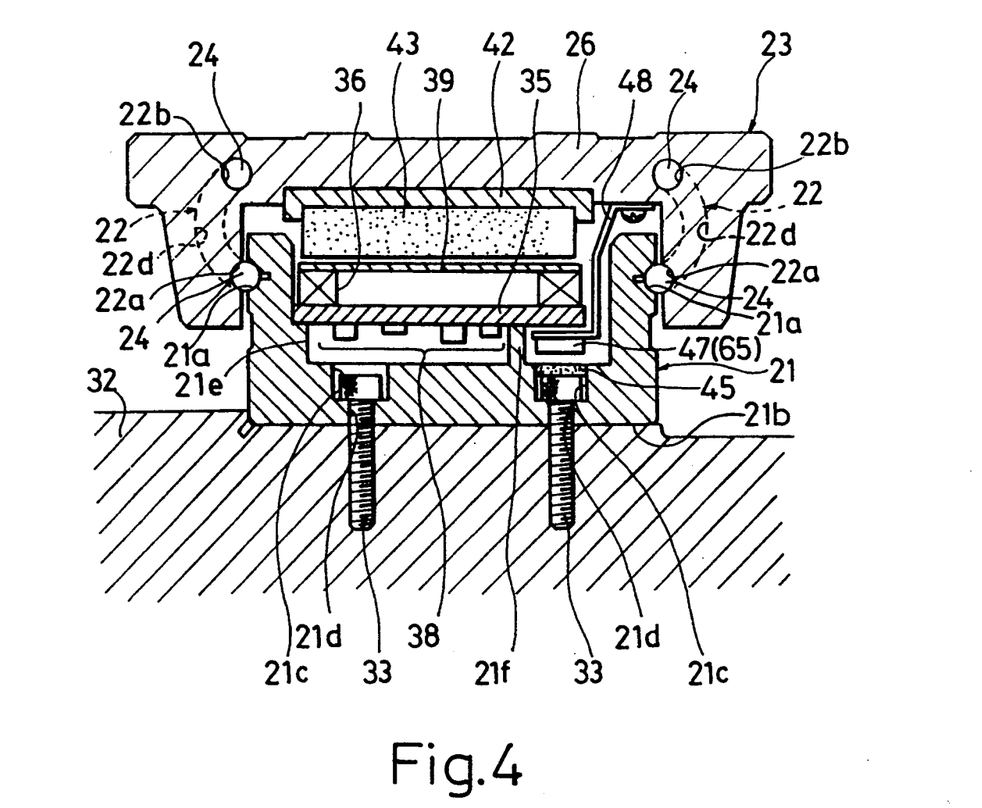
FIG. 4 is a cross-sectional view taken along arrows E—E relating to FIG. 3.

As indicated in FIGS. 2 through 4, this guide unit has rail 21, formed so that the shape of its perpendicular cross-section with respect to its lengthwise direction is opened upwards roughly in the shape of the letter "U", rolling element circulating path 22 (reference numerals indicated in FIGS. 3 and 4, details to be described later), and sliding unit 23 in the form of a slider able to move relative to said rail 21. One each of track grooves 21a are formed in the lengthwise direction on the left and right outer sides of track rail 21, in the form of a track having a roughly semi-circular cross-section. However, the number of these track grooves 21a is not always limited to two. Two of the above-mentioned rolling element circulating paths 22 are provided to correspond to each of these track grooves 21a. Within said rolling element circulating path 22, a plurality of balls 24 in the form of rolling elements are arranged to circulate while rolling over track grooves 21a accompanying movement of sliding unit 23, while also bearing the load between track rail 21 and sliding unit 23.

This sliding unit 23 has casing 26 straddled across track rail 21, a pair of end plates 27a and 27b coupled to both ends of said casing 26, and two seals 28a and 28b attached to the outer surfaces of each of said end plates 27a and 27b. Furthermore, grease nipple 29 is attached to end plate 27a for supplying grease to the above-mentioned balls 24. As indicated in FIGS. 3 and 4, each rolling element circulating path 22 is composed of load-bearing track groove 22a and return path 22b formed linearly and mutually in parallel on both the left and right ends of casing 26, and a pair of roughly semi-circular shaped directional changing paths 22c and 22d formed in both end plates 27a and 27b that connect said load-bearing track groove 22a and return path 22b with both of these ends. Furthermore, the above-mentioned load-bearing rail track 22a opposes track groove 21a of track rail 21.

The guiding device having the above-mentioned constitution is arranged, for example, on a frame in the form of flat bed 32 equipped on a machine tool indicated in FIGS. 3 and 4 (the entire machine tool is not shown). Track rail 21 is fastened to said bed 32 by a plurality of bolts (with hexagon sockets) 33. Consequently, track rail 21 has flat mounting surface 21b for mounting on bed 32 on its bottom. Furthermore, as indicated in FIGS. 3 and 4, countersunk portion 21c, having a diameter larger than the heads of said bolts 33, and hole 21d, having a diameter slightly larger than the threaded portions of bolts 33, are arranged in a row mutually concentrically and in the lengthwise direction of track rail 21 in the bottom of said track rail 21. Bolts 33 are screwed into bed 32 by being inserted so that they are entirely embedded in countersunk portion 21c and hole 21d. Furthermore, countersunk portion 21c and hole 21d are generically referred to as insertion holes. In addition, as indicated in FIG. 2, a plurality of threaded holes 26a are formed in the upper surface of casing 26 of sliding unit 23. A table that holds a workpiece and so on (not shown) is fastened to said casing 26 by bolts (with hexagon sockets, not shown) that are screwed into these threaded holes 26a.

The following provides a description of the primary and secondary sides of the direct current linear motor that are mutually guided by the guide unit having the constitution described above.

As indicated in FIGS. 2 and 4, the primary side of said direct current linear motor has rectangular plate-shaped coil yoke 35, provided so as to extend over roughly the entire length of track rail 21 on said track rail 21, and a plurality of armature coils 36 arranged in a row on said coil yoke 35. Furthermore, coil yoke 35 is arranged near the bottom of track rail 21 formed such that the shape of its cross-section opens upward in the shape of the letter "U". More specifically, one support ledge 21e and one support projection 21f each are formed mutually in parallel in track rail 21 near the bottom of said track rail 21, and coil yoke 35 is supported by support ledge 21e and support projection 21f. Moreover, coil yoke 35 is also fixed on track rail 21 by means of adhesive or small screws, etc. In addition, as indicated in the drawings, each armature coil 36 is wound roughly into the shape of a rectangular loop.

As indicated in FIG. 4, electronic component group 38, consisting of an IC, transistor and so on, and composing a control circuit, is provided on the lower surface of coil yoke 35. Wiring for electrically connecting these electronic components together is etched on the surface of coil yoke 35.

In addition, as indicated in FIGS. 2 and 4, thin board 39, composed of plastic and so on, is mounted on the upper surface of each armature coil 36 for fixing each of said armature coils 36 in position.

On the other hand, the secondary side is composed in the manner described below.

Figure 5:
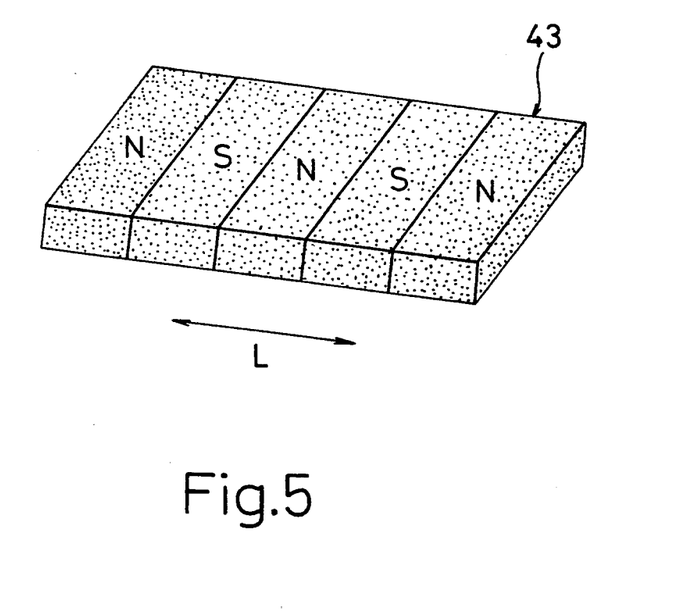
FIG. 5 is a perspective view of the field magnet equipped on the direct drive unit indicated in FIGS. 2 through 4.

As indicated in FIG. 4, said secondary side has magnet yoke 42 mounted on the lower side of casing 26, a constituent member of sliding unit 23, and field magnet 43 mounted on the lower surface of said magnet yoke 42 so as to oppose each of the armature coils 36 of the above-mentioned primary side. As is clear from FIG. 5, the overall shape of field magnet 43 is roughly that of rectangular plate. Said field magnet 43 contains a plurality of, in this case 5, N and S magnetic poles so that said magnetic poles are arranged alternately side by side along direction L in which relative movement is performed by the primary side and secondary side, or in other words, the lengthwise direction of track rail 21.

The following provides an explanation of the constitution of the position detection device for detecting the position of sliding unit 23 with respect to track rail 21, and the control system that performs positional control based on detection signals generated by said position detection device. Firstly, a description of said position detection device is given.

Figure 6:
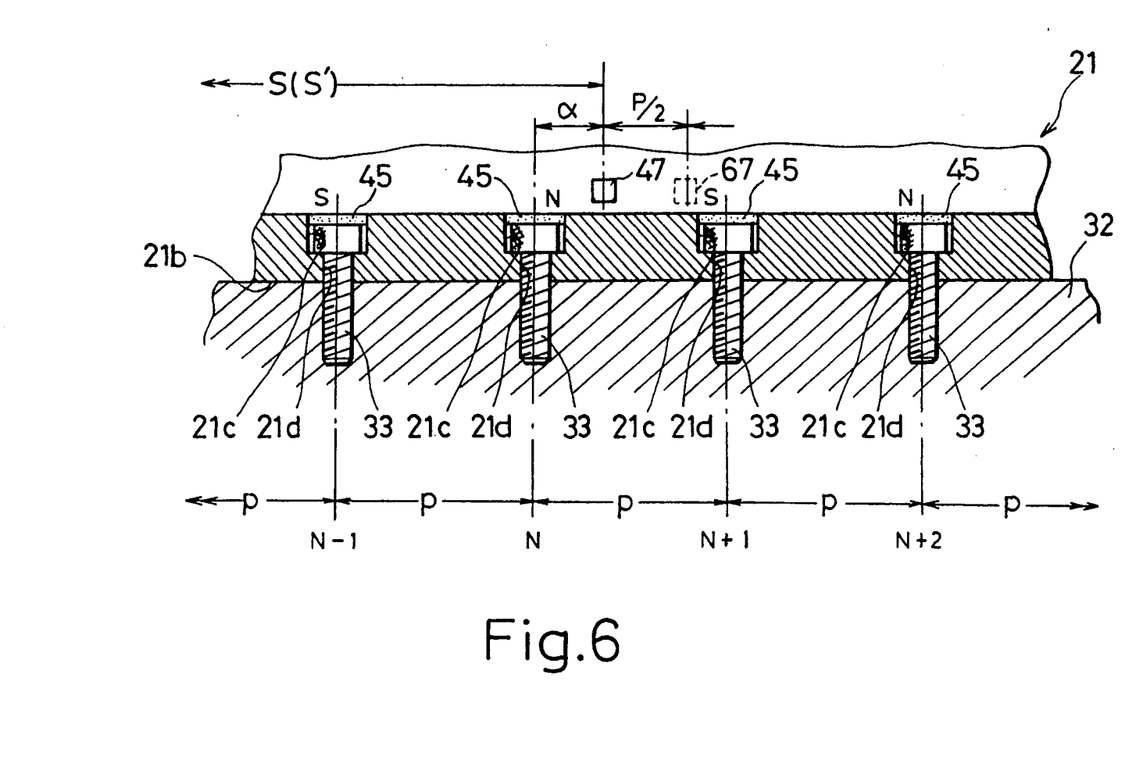
FIG. 6 is a cross-sectional side view of the essential components of the direct drive unit indicated in FIGS. 2 through 4.

As indicated in FIGS. 2 through 4 and FIG. 6, roughly disk-shaped plugs 45, acting as the detected elements, are tightly inserted into each of countersunk portions 21c so as to cover the openings of each of said countersunk portions 21c formed in track rail 21 for insertion of bolts 33. Furthermore, as is clear from FIG. 4, although one row each of insertion holes, consisting of countersunk portions 21c and holes 21d formed for insertion of bolts 33, are provided in a row along both the right and left sides of track rail 21 for a total of two rows, said plugs 45 are inserted into said insertion holes for one of these two rows. These plugs 45 are magnetized so as to be magnetic, and as indicated in FIG. 6, are positioned so that differing magnetic poles are alternately arranged.

On the other hand, as indicated in FIGS. 4 and 6, electromagnetic conversion element A 47 and electromagnetic conversion element B 65, composed of detecting elements in the form of Hall devices and so on, are arranged so as to be able to opposed to each of the above-mentioned plugs 45. Moreover, said electromagnetic conversion element A 47 and electromagnetic conversion element B 65 are attached to sliding unit 23 by means of small brackets 48 (shown in FIG. 6). This small bracket 48 is mounted to sliding unit 23 by small screws (reference numeral not shown).

Figure 7:
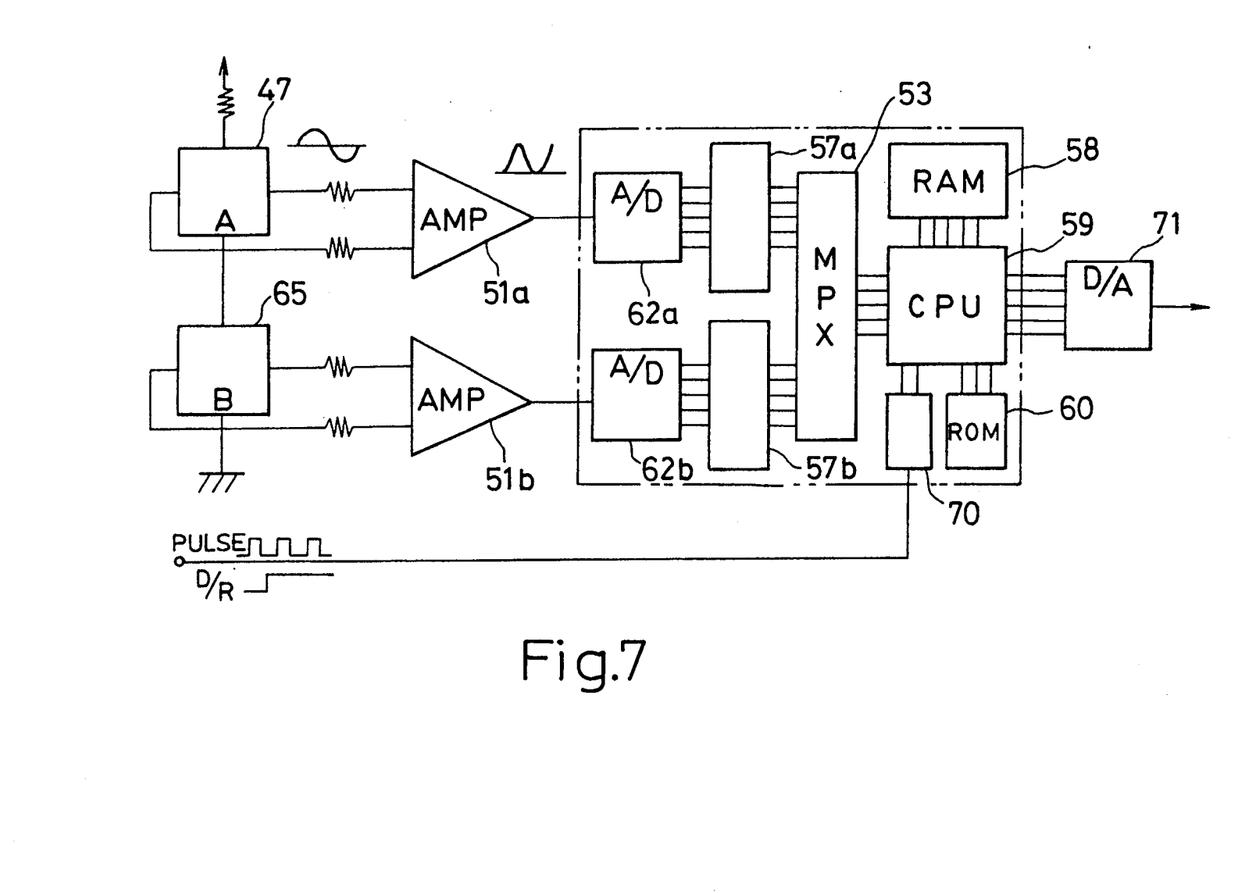
FIG. 7 is a block drawing indicating the control system that performs operational control of the direct drive unit indicated in FIGS. 2 through 4.
Figure 8A:
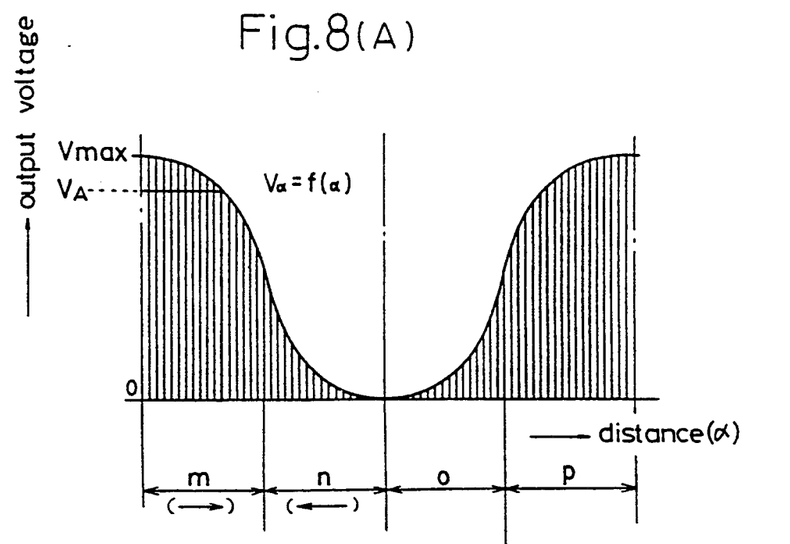
FIGS. 8A and 8B are drawings indicating the waveforms that are obtained by the electromagnetic conversion elements equipped on the direct drive unit indicated in FIGS. 2 through 4.
Figure 8B:
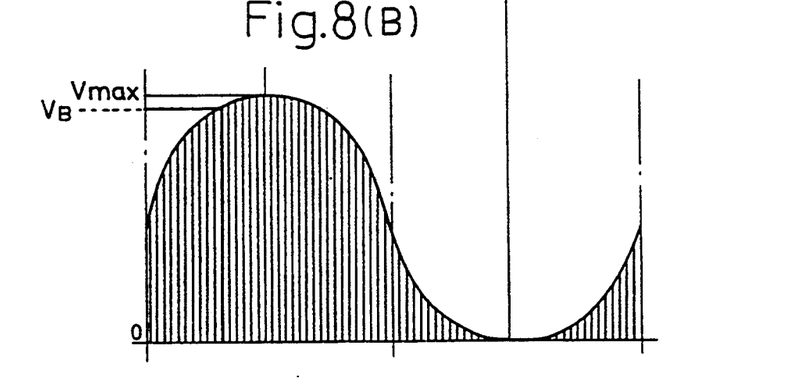

Above-mentioned magnetic conversion element B 65 is provided shifted by ½ the pitch P between bolts 33 indicated in FIG. 6 with respect to electromagnetic conversion element A 47. As a result, a waveform is obtained having a different phase by $\pi/2$ with respect to the waveform indicated in FIG. 8(A). Furthermore, as indicated in FIG. 8, the waveforms obtained by electromagnetic conversion element A 47 and electromagnetic conversion element B 65 are sine waves with continuous positive and negative components with respect to a 0 level baseline. However, these waveforms can be amplified from the 0 level to the level of Vmax by passing through amplification circuits 51a and 51b as indicated in FIG. 7. This is done to facilitate signal processing at a later stage.

The position detection device is composed of the above-mentioned detecting elements in the form of electromagnetic conversion element A 47 and electromagnetic conversion element B 65, and detected elements in the form of each of plugs 45.

The following provides an explanation the constitution of the control system for performing positional control of sliding unit 23 with respect to track rail 21 based on detection signals generated by the above-mentioned position detection device.

As indicated in FIG. 7, the waveforms output from electromagnetic conversion element A 47 and electromagnetic conversion element B 65 enter amplification circuits 51a and 51b. These amplification circuits 51a and 51b are sequentially connected to A/D conversion circuits 62a and 62b, latching circuits 57a and 57b and multiplexer (MPX) 53. The output of this multiplexer 53 enters CPU (control circuit) 59. In addition, this CPU 59 is connected to memory (ROM) 60, a counting device in the form of up-down counter 70, and D/A conversion circuit 71.

The above-mentioned A/D conversion circuits 62a and 62b convert the analog waveforms amplified by amplification circuits 51a and 51b of the previous stage into binary data. Said binary data then respectively enters latching circuits 57a and 57b. These latching circuits 57a and 57b latch and hold the data of A/D conversion circuits 62a and 62b in order to synchronize the data that has been respectively converted by said A/D conversion circuits 62a and 62b of the previous stage. This held data then enters multiplexer (MPX) 53. Since this multiplexer (MPX) 53 cannot simultaneously output the data latched by latching circuits 57a and 57b in the case of output to CPU 59 at a later stage, each piece of data is processed separately on a time sharing basis after which it is output to CPU 59 for arithmetic processing.

The following provides an explanation of the arithmetic processing of CPU 59.

As the initial operation of this processing, sliding unit 23 moves to a reference position not shown. As a result of the operation of a reference position sensor (not shown) provided at said reference position, scale position data stored in memory 58 is reset. As a result of this reset command, sliding unit 23 begins to move to the prescribed position. Correspondingly, the amplified continuous waveforms of different phase indicated in FIGS. 8(A) and 8(B) are obtained from electromagnetic conversion element A 47 and electromagnetic conversion element B 65.

As indicated in FIGS. 8(A) and 8(B), when looking at regions m and n, it can be seen that the waveforms corresponding to the output data of electromagnetic conversion element A 47 and electromagnetic conversion element B 65 differ in FIG. 8(A) and FIG. 8(B). As a result, CPU 59 is able to determine the direction of movement of sliding unit 23 by comparing this differing data.

Next, the amount of movement of electromagnetic conversion element A 47 and electromagnetic conversion element B 65, or in other words, the amount of movement S of sliding unit 23, is determined from the voltage ratio of $V_A/V_B$ when, for example, the voltage of electromagnetic conversion element A 47 is taken to be $V_A$ and the voltage of electromagnetic conversion element B 65 is taken to be $V_B$ as indicated in FIG. 8(A) and 8(B). Although the voltages of $\alpha \times V_A$ and $\alpha \times V_B$ are obtained from the change in the gap between electromagnetic components A 47 and B 65 and the detected element in the form of each of plugs 45, there is the risk of arithmetic processing being performed as if sliding unit 23 had moved due a change in this gap when it had actually not moved. Therefore, when processing is performed in the form of $\alpha \times V_A/\alpha \times V_B$ in order to prevent this type of mechanical error, $V_A/V_B$ can be determined with $\alpha$ being unrelated to positional data.

Then, since minute positional data within 1 pitch (P) corresponding to $V_A/V_B$ is previously stored in memory 60, CPU 59 is able to determine distance $a$ indicated in FIG. 6 by reading the value that coincides with the value of $V_A/V_B$ determined by the arithmetic processing described above from memory (ROM) 60 and comparing that value. Since previously determined positional data is already stored in memory 58 (although not stored when data is initially written from the above-mentioned reference position), the positional data of distance α that has been most recently determined is added after CPU 59 reads the above-mentioned previous data. As a result, the computed distance S is written into memory 58 as positional data.

By repeating this arithmetic processing, the distance S which sliding unit 23 moves is stored in the above-mentioned memory 58 in the form of positional data.

However, an up-down counter 70, that is shifted up and down by the pulses applied by a control device not shown, is connected to CPU 59. This up-down counter 70 is composed so as to operate in response to a reset command from memory 58. In addition, since the number of pulses that are generated for 1 pitch (P) indicated in FIG. 6 is previously determined, CPU 59 is able to compute distance S' by counting the number of pulses output from this up-down counter 70.

The amount of deviation is then determined by comparing this determined distance S' with the above-mentioned distance S stored in memory 58. This resulting amount of deviation is output by CPU 59 from D/A converter 71. Sliding unit 23 is then driven to the proper position based on this output.

As described above in the above-mentioned embodiment, since the proper position is determined by comparing distance S stored in memory 58 with distance S' determined based on the number of pulses applied externally, highly precise positioning is able to be performed.

Furthermore, in the above-mentioned embodiment, although the position detection device for detecting the relative positions of track rail 21 and sliding unit 23 is composed of electromagnetic conversion element A 47, electromagnetic conversion element B 65 and a permanent magnet in the form of plugs 45, the present invention is not limited to said constitution, but various other combinations of constitutions can also be applied, such as the use of a detected element in the form of a light reflecting plate and detecting this light reflecting plate with an optical detecting element.

In addition, although a permanent magnet functioning as a detected element in the form of plugs 45 are provided in bolt insertion holes, and detecting elements in the form of electromagnetic conversion element A 47 and electromagnetic conversion element B 65 are mounted on sliding unit 23 in the above-mentioned embodiment, conversely, the present invention can also be composed so that a detecting element is provided in a bolt insertion hole and a detected element is mounted on sliding unit 23.

In addition, although detected elements in the form of plugs 45 are provided in all the bolt insertion holes arranged in a single row in the above-mentioned embodiment, they may also be provided in every other or every two other bolt insertion holes.

On the other hand, although balls 24 circulate within sliding unit 23 accompanying movement of said sliding unit in the above-mentioned embodiment, the above-mentioned embodiment is not limited to said constitution, but other constitutions may naturally also be applied. Moreover, although balls are used as the rolling elements in the above-mentioned embodiment, a constitution wherein rollers are used may also be employed.

According to the present invention as explained above, since plugs are arranged to cover the openings of insertion holes formed for insertion of fastening members in a track rail for one of either a detected element or detecting element that compose a position detection device for detecting the relative position of said track rail and a slider, the amount of space occupied by said position detection device can be made to be extremely small thereby allowing overall size of the unit to be reduced.

In addition, according to the present invention, since a position detection device is composed with at least 2 or more electromagnetic conversion elements arranged to obtain waveforms having different phases, a latching device converts and latches the waveforms obtained from said electromagnetic conversion elements into digital data, and movement distance is determined from this latched data and data previously stored in readable memory, this movement distance is added to the distance stored in writeable/readable memory and the resulting distance is written into said memory to determine the correct distance, thereby offering the advantage of having a simple constitution and being able to perform highly precise positioning.

What is claimed is:

1. A guide unit comprising: a track rail wherein a track is formed in a lengthwise direction; a slider guided by the track; and, a position detection device for detecting the relative positions of the track rail and the slider; wherein, insertion holes for inserting fastening members for fixing said track rail onto a prescribed frame are arranged in a row in the lengthwise direction in the track rail, the position detection device is composed of a detected element and a detecting element, one of either the detected element or the detecting element is mounted on the slider, and the other is inserted into the insertion holes.

2. The guide unit of claim 1, wherein the detected element is magnetized and the detecting element is composed of electromagnetic conversion elements.

3. The guide unit of claim 1, wherein the detected element is inserted into the insertion holes so as to cover the openings of the insertion holes.

4. A direct drive unit comprising: a track rail wherein a track is formed in the lengthwise direction; a slider guided by the track; a position detection device for detecting the relative positions of the track rail and the slider; and, a direct current linear motor that relatively drives the track rail and the slider; wherein, insertion holes for inserting fastening members for fixing said track rail onto a prescribed frame are arranged in a row in the lengthwise direction in the track rail, the position detection device is composed of a detected element and a detecting element, one of either the detected element or the detecting element is mounted on the slider, and the other is inserted into the insertion holes so as to cover the openings of said insertion holes.

5. A direct drive unit comprising: a track rail wherein a track is formed in the lengthwise direction; a slider guided by the track; a position detection device for detecting the relative positions of the track rail and the slider; and, a direct current linear motor that relatively drives the track rail and the slider; wherein, the position detection device is composed of at least two or more electromagnetic conversion elements arranged so as to obtain waveforms having different phases, and comprises a latching device that latches the waveforms obtained from said electromagnetic conversion elements by converting said waveforms into digital data, and a control device that performs control by determining movement distance from this latched data and data previously stored in readable memory, adding this movement distance to distance stored in readable/writeable memory, writing this resulting distance into said memory and then performing arithmetic processing.

6. The direct drive unit of claim 5, wherein the electromagnetic conversion elements are arranged at an interval of at least $\pi/2$.

7. A guide unit comprising:
 a track rail including a track and a plurality of insertion holes arranged in the direction of the track;
 a slider means for moving along the track.
 a position detection means for detecting the relative positions of the track rail and the slider means, the position detecting means including a detecting element and a plurality of detected elements, wherein at least one of the plurality of detected elements is inserted into one of the plurality of insertion holes;

8. The guide unit of claim 1, wherein the detected element is magnetized and the detecting element is composed of electromagnetic conversion elements.

* * * * *